July 11, 1944.  M. F. GRUBER  2,353,459
METHOD OF AND APPARATUS FOR SPRAY-DRYING LIQUIDS
WHICH HAVE NONLIQUID INGREDIENTS
Filed April 24, 1941  2 Sheets-Sheet 1
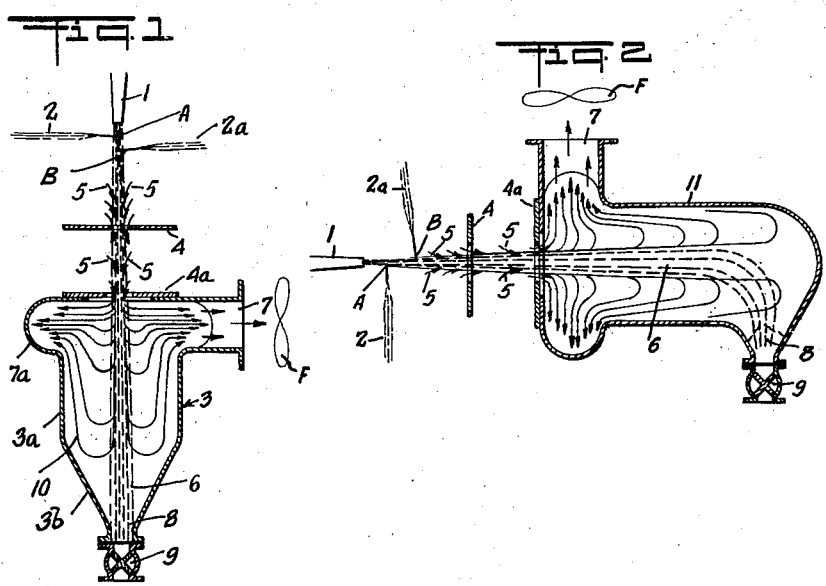
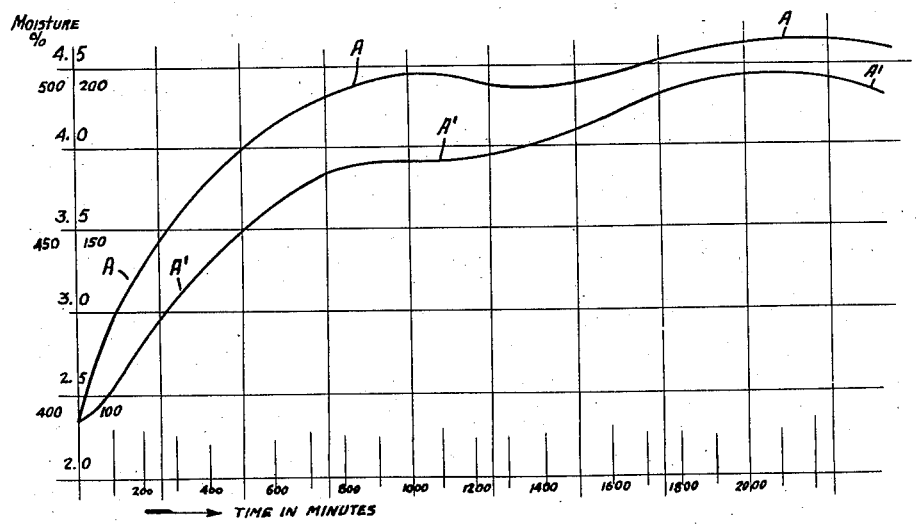
INVENTOR.
Max Friedrich Gruber
BY Mock & Blum
ATTORNEYS Patented July 11, 1944

2,353,459

UNITED STATES PATENT OFFICE 2,353,459

METHOD OF AND APPARATUS FOR SPRAY-DRYING LIQUIDS WHICH HAVE A NON-LIQUID INGREDIENT

Max Friedrich Gruber, Stamford, Conn., assignor to Inredeco, Inc., Panama City, Panama, a corporation of Panama Application April 24, 1941, Serial No. 390,078

9 Claims. (Cl. 159—4)

My invention relates to a new and improved method of spray-drying liquids in which a solid material is dissolved, or with which a solid material is intermixed. Without limiting the invention, it includes the production of milk powder from whole milk or skimmed milk or partially skimmed milk, and the treatment of liquid coffee extract, fruit juices, food products of all kinds, etc.

One of the objects of the invention is to atomize and vaporize the liquid, in order to produce the solid material in finely divided form, anterior a separating chamber or other separating device, by means of a jet of hot air or any suitable gas or mixture of gases, and then to lead the mixture of finely divided solid material and gas and vapor into the separating chamber or other separating device, where the powder is separated in dry form. The nozzles are thus freely accessible, and the process is regulated so that there is no danger of overheating the solid particles, or of causing the solid particles to cling to the wall of the separating chamber or other separating device.

Another object of the invention is to dry the powder in air or any suitable gas or mixture of gases or other gas-like medium whose absolute humidity and whose relative humidity is a minimum, and much less than the absolute humidity and the relative humidity of the atmospheric air, if the atmospheric air has relatively high humidity as in moist tropical climates. This is particularly important in making milk powder or the like in hot and moist climates.

Another object of the invention is to aspirate additional atmospheric air towards or into the jet of heated air which is used for atomizing and vaporizing the liquid, and to regulate the amount of additional air which is thus moved in unison with the jet of heated air. This additional air may be partially intermixed with the jet of heated air, or said additional air may substantially form a sheath which surrounds the jet of heated air and which moves in unison with the jet of heated air.

Another object of the invention is to use a separating device or chamber which is provided with a first outlet through which the vapor and air are withdrawn, said separating chamber or device also having a second outlet through which powdered material is withdrawn, the first outlet being located anterior the second outlet.

Another object of the invention is to subject the separating chamber or device to suction at the first outlet, so as to facilitate the removal of water vapor from the separating device or chamber, anterior the collecting zone in which the powder is collected.

Another object of the invention is to cause the jet of air which is intermixed with the finely divided solid material, to create a pressure in the collecting zone of the separating chamber, which is greater than the pressure in the separating chamber anterior said collecting zone, so that little or no water vapor will enter the collecting zone, due to the fact that at the same temperature, the density of water vapor is less than the density of air.

Whenever I refer to the use of air, I include the use of any gas or mixture of gases, and said gas or gases may be inert, such as carbon dioxide or nitrogen or the like.

Another object of my invention is to provide a method whereby the contact of the solid particles with the oxygen of the air is minimized.

Another object of the invention is to provide a milk powder or the like of low hygroscopicity, so that the stability of the product is increased.

Other objects of my invention will be stated in the annexed description and drawings which illustrate certain preferred embodiments of my invention.

Fig. 1 is a diagrammatic view, of one embodiment of the invention, in which the heated jet of air is moved downwardly along a vertical axis and in which the separating chamber has a vertical axis. The separating chamber is drawn substantially according to scale.

Fig. 2 illustrates another embodiment of the invention, in which the jet of air is moved along a horizontal axis.

Fig. 3 illustrates the smaller hygroscopicity of the improved milk powder.

Figure 4:
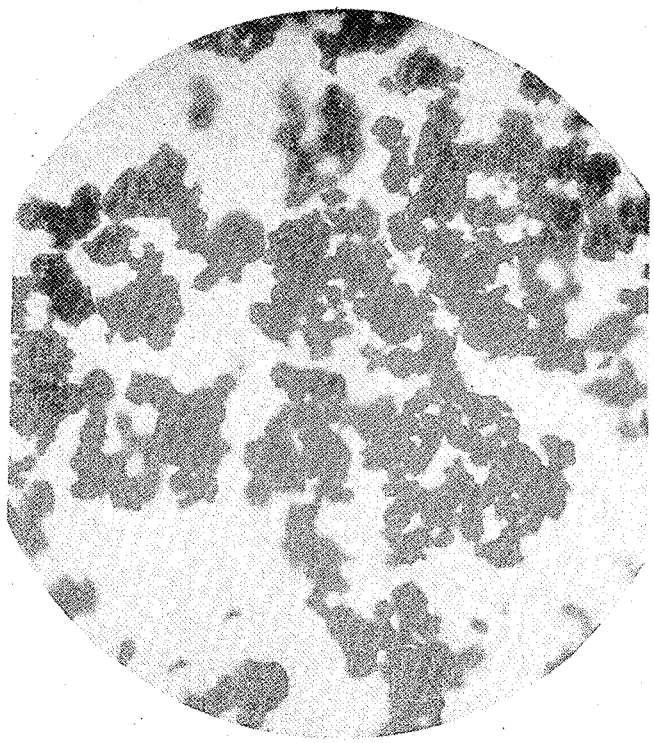
Fig. 4 is a microphotograph of milk powder made according to the invention, the particles of milk powder being enlarged 95 diameters.

Heretofore, and in all known processes for evaporating liquids or solutions to dryness by means of hot air, the hot air and the liquid have been brought together in a closed spraying chamber, where the liquid or solution has been atomized and dried. Such known processes have often produced irregularities in the dried product. In such known processes, the degree of humidity of the air in the spraying and drying chamber may vary, so that the milk powder or the like contains moisture. In such known methods, burnt particles of milk powder or the like are formed by the contact of said particles with parts of the chamber whose temperature is too high. Partially dried particles of powder cling to the inner wall of the spraying chamber. In addition, the spraying nozzles are not readily accessible.

To avoid some of these disadvantages, very large spraying chambers have been used, but such large chambers cause considerable losses of milk powder or the like, and they require a high cost of plant manufacture. Likewise, the interiors of such large chambers are not readily accessible and full control of all the steps of the process cannot be secured. In addition, the dryness of the final milk powder or the like is injuriously affected by the humidity of the air in the spraying chamber, especially in tropical climates where the air is hot and moist.

According to the improved method, one or more jets of the liquid which is to be evaporated, are introduced laterally into a jet of highly heated air, while some additional air is also permitted to enter the zone of processing.

In effect, the hot air and the liquid which is to be dried and the auxiliary air, are brought together in the open atmosphere without the use of a drying chamber.

The invention will be further explained with reference to a specific example which is merely offered for purposes of illustration, it being understood that the invention is not limited to the details of such example.

Fig. 1 shows a pipe 1 through which a jet of hot air is supplied. The axis of this jet is vertical. The cross-sectional diameter of the mouth of the nozzle or tube 1 is 120 mm. in the illustrative example described herein. Hot air or other gas or mixture of gases is forced through the pipe 1. The diameter of the jet of hot air or gas which issues from the mouth of pipe 1 is 120 mm., and said jet is substantially of cylindrical shape. I can use inert gases, such as nitrogen or carbon dioxide, instead of using air. The velocity of the hot air, as it issues from the mouth of the pipe 1, is from 100 meters to 300 meters per second. It is preferably between 150–200 meters per second. The temperature of the hot air or gas which is thus delivered may be as high as 500° C. Ordinarily, temperatures of 400° C. or 435° C. are satisfactory.

Milk is forced through the respective nozzles 2 and 2*a*. This milk may be concentrated. For example, water may have been removed by evaporation, so that the milk which is delivered through the nozzles 2 and 2*a* contains 40% of solids by weight, and 60% of water by weight. The milk is forced through the respective nozzles 2 and 2*a* under a pressure which is substantially one atmosphere in excess of the atmospheric pressure. The nozzles 2 and 2*a* jointly deliver about 9.2 kilos per minute of this concentrated milk, in the given example. Equal quantities of this milk are forced through the respective nozzles 2 and 2*a*, so that each nozzle delivers about 4.6 kilos per minute of said concentrated milk. The axis of the jet of milk which is delivered through the nozzle 2 may be perpendicular to the axis of the jet of hot air which is delivered through the nozzle 1. If desired, the axis of the nozzle 2 may be inclined forwardly relative to the axis of the nozzle 1, in the direction of movement of the jet of hot air. The axis of the nozzle 2*a* has such forward inclination. The angle between the respective axes of the nozzles 1 and 2 may be as low as 30°, although it is preferred that said angle should not be less than 60°. This variation in angle depends upon the density of the liquid which is being atomized and dried. The point A at which the axis of the nozzle 2 intersects the axis of the nozzle 1 may be spaced about 200 mm. from the mouth of the nozzle 1. This distance may be varied about 25 mm., namely, between 175 mm. and 225 mm.

The axis of the nozzle 2*a* may also be perpendicular to the axis of the nozzle 1, or the axis of the nozzle 2*a* may be inclined forwardly, as previously described. The distance between the point B, at which the axis of the nozzle 2*a* intersects the axis of the nozzle 1, is about 50 mm., from the point A, at which the axis of the nozzle 2 intersects the axis of the nozzle 1.

I can use any number of nozzles, for supplying the milk, either one nozzle, or more than two nozzles. The nozzles 2 and 2*a* are external to the outer lateral wall of the jet of heated gas.

The jet of air atomizes the jets of milk which are delivered through the nozzles 2 and 2*a*, so that the fine irregular particles of milk powder are carried along by the jet of heated air, with little or no loss. The mixture of heated air and particles of milk powder then passes through the opening of a first diaphragm 4, together with the water vapor.

The amount of atmospheric air which is aspirated towards the jet of heated air, between the mouth of nozzle 1 and the point A, is insufficient to substantially lower the temperature of the hot air, for the purposes of the invention. The distance of point A from the mouth of the nozzle and of point B from point A can be made even smaller than as previously stated. The vaporization of the water of the milk at points A and B supplies an additional internal partial pressure to the mixture of air and atomized milk. Hence, the lateral aspiration of the atmospheric air begins substantially, as indicated by arrows 5, below the point B.

The atmospheric air, which may be designated as additional air, substantially forms a sheath which surrounds the central jet of heated air and atomized milk. The lateral flow of additional atmospheric air is controlled by the thin diaphragms 4 and 4*a*, which are made of metal. The thickness of a diaphragm is about 5 mm. The openings of these diaphragms are of adjustable diameter. For this purpose, the familiar iris control (not shown) may be used. The diaphragm 4*a* is maintained in close contact with the wall of separating chamber 3, at the inlet of said chamber 3. The diaphragm 4 may be longitudinally shifted, in addition to adjusting its bore.

In the practical example stated herein, the vertical distance of diaphragm 4 from the mouth of nozzle 1 is about 600 mm., and the circular bore of diaphragm 4 has a diameter of about 200 mm. The vertical distance of diaphragm 4*a* from diaphragm 4 is about 300 mm., and the diameter of the circular bore of diaphragm 4*a* is about 300 mm.

The milk is wholly transformed into milk powder and water vapor, preferably between the diaphragms 4 and 4*a*. The zone between the diaphragms 4 and 4*a* may therefore be designated as the drying zone, although there may be some formation of dried milk powder, above the first diaphragm 4. The milk may be wholly transformed into milk powder, anterior the first diaphragm 4. In any event, the water of the milk is wholly vaporized, above the diaphragm 4*a*. The invention is not limited to the use of two diaphragms, as one or more of these diaphragms could be used. The milk is atomized and its solids are dried into powder form, preferably during a very short period after the initial contact of the milk with the jet of hot air. This period of time is preferably much less than 0.01 of a second.

The water vapor which results from the evaporation of the water in the milk or the like, expands outwardly and laterally into the atmospheric air which is aspirated by the jet of hot air laterally towards said jet. The atmospheric air which is thus laterally aspirated, substantially forms a sheath which encloses the central jet of hot air, in which central jet the particles of milk powder are suspended and conveyed. This sheath of aspirated atmospheric air has a lower temperature than the central jet of hot air. The pressure of the water vapor causes it to expand laterally from the central hot jet of air, into the relatively cool sheath of aspirated atmospheric air.

The mixture of air and water vapor and particles of milk powder then enters the separating chamber 3. The bottom collecting end 8 of this separating chamber 3 has any suitable continuously operated or intermittently operated conventional conveyor 9, for carrying the dried milk powder away from said end 8, without permitting the escape of air or vapor. The pressure at the collecting end 8 may be from minus 5 to plus 5 mm. of water, depending upon the amount of suction effect which is exerted by suction fan F. For practical purposes, the chamber 3 may be considered as closed at the rear end of the collecting zone 8, even if the powder is continuously removed rearwardly from said zone 8. The chamber 3 has an outlet 7 at its front end. In the practical example stated herein, this outlet opening 7 is substantially circular and it has a diameter of about 500 mm. At its entering or front end, the chamber 3 is formed with an annular enlargement 7a, and the outlet opening 7 is located in this annular enlargement 7a. The chamber 3 has a main body portion 3a of substantially cylindrical shape, behind the annular enlargement 7a. Said chamber 3 also has a rearwardly tapered frusto-conical portion 3b.

Since the density of the water vapor is less than the density of air at the same temperature, the water vapor is largely discharged immediately in the enlargement 7a through the outlet opening 7, because the pressure increases towards the collecting end 8. As indicated by the curved lines 10, some of the water vapor may penetrate into the cylindrical portion 3a of the chamber 3, but little or none of the water vapor penetrates to the front end of the frusto-conical portion 3b. The powder is carried to the collecting portion 8 by the jet 6. The wall of the chamber 3 is made of aluminum or stainless steel or any other suitable metal, and it is allowed to radiate its heat freely to the external atmosphere. The temperature of the wall of the chamber 3, at the end 8, where the dried milk powder is deposited, is about 80° C.–85° C. The wall of the portion 3a of the chamber 3 may have a temperature of about 75° C.–80° C. The wall of the chamber 3 may be thin, namely, about 3 mm. in thickness.

A suitable suction fan F or the like is located directly adjacent the outlet 7, and externally to the chamber 3, so as to suck water vapor and air laterally out of the chamber 3, while the milk powder moves towards the collecting end 8. A suitable supply of the collected powder is maintained at the bottom of the member 3b, so that the conveyor 9 can operate without permitting an escape of air or vapor at the end 8.

About 1.8 kilos of a mixture of air and water vapor are discharged from the outlet 7, for each kilo of hot air which is supplied through the nozzle 1.

The powder is thus separated and collected in a part of the chamber 3 in which the relative humidity of the air is a minimum and said relative humidity is much lower than at the outlet opening 7. Likewise, the powder is separated and collected in a part of the separating chamber 3, in which the temperature of the air is higher than the temperature of the air and water vapor which are exhausted from the outlet opening 7. The temperature of the mixture of air and water vapor which passes out of the outlet opening 7 is approximately 75°–80° C., in the example previously given.

According to the improved method, only a part of the total mass of air which is used in the process comes directly into contact with the milk powder, so that the effect of oxygen on the milk powder is greatly reduced. During the entire process, the powder is in contact only with air whose relative humidity is very low, so that the collected powder has an improved compact texture and it has a minimum percentage of moisture.

Fig. 3 illustrates the lowering of the hygroscopicity of the improved milk powder which is made according to the improved process. The graph A illustrates the hygroscopicity of a standard powder made according to the previously known process, and the graph A′ is a graph which illustrates the lower hygroscopicity of milk powder which is made according to the improved process. Specimens of such powders were tested in air having a relative humidity of 35%. The abscissa of the graph represents time in minutes and the ordinate of the graph illustrates the percentage of moisture by weight, which is absorbed by the powder. It will be noted that after a period of three hours and twenty minutes, the improved powder has only taken up about 2.8% of moisture by weight, and that powder which has been made by the old process has taken up about 3.2% of moisture. If the test is made in air which has a relative humidity of 50%, an even greater difference appears between milk powder made according to the new method, and standard milk powder.

Fig. 4 shows that the particles or aggregates of the particles of the improved milk powder are more irregular, and differ from each other more in shape and in size, than powder made according to known processes. This is an advantage, because the improved powder can be poured more readily through a filling nozzle or the like. It is also more easily miscible with water and other liquids.

Fig. 2 is substantially the same as Fig. 1, save that the jet of heated air is moved along a horizontal axis. The separating chamber 11 is of slightly different shape than the separating chamber 3, but the operation of the two types of devices is substantially the same.

In order to identify some of the general terms which are used in the claims, milk, liquid coffee extract and the like, may be designated as a liquid which has a non-liquid ingredient which is dissolved in the liquid or which is intermixed with the liquid. Of course, the liquid may contain a plurality of non-liquid ingredients. This liquid is treated in order to separate the non-liquid ingredient or ingredients in finely divided form from said liquid. The liquid is atomized and vaporized anterior a separating chamber, so that the non-liquid ingredient is finely divided anterior the separating chamber. The finely divided non-liquid ingredient and the vapor of the liquid are then led into the separating chamber, where the finely divided non-liquid ingredient is separated from the vapor. Preferably, the finely divided non-liquid ingredient is removed from said chamber through one outlet, and the vapor is removed from said chamber through another outlet.

If the liquid is atomized and vaporized by a jet of heated gas, or by a jet which includes a mixture of heated gases, the gas or gases are preferably of greater density than the vapor of the liquid, at the temperature at which the finely divided non-liquid ingredient is separated from the vapor and from the gas or gases. The jet of heated gas or gases aspirates additional gas or gases thereto, after the liquid has been atomized. When I specify, in a claim or claims, that additional gas is aspirated towards the jet of gas, subsequent to the atomization of the liquid, I include a method in which some additional gas is added to or aspirated towards said jet, prior to the atomization of the liquid. I also include a method in which some of the additional gas is intermixed with the jet. Likewise, when I specify the use of a gas in a claim, I include the use of a plurality of gases, and the use of one or more non-aqueous vapors. The mixture of gas or gases, and vapor, and finely divided non-liquid material, is moved into the separating chamber, along a predetermined path. The vapor is deflected from said path towards its outlet, anterior the zone where the finely divided non-solid material is collected. Likewise, the aforesaid mixture is subjected to a lateral aspirating or suction effect at the mouth 7, by the suction fan F or the like. However, the finely divided non-liquid material is moved through said path with sufficient velocity so that said finely divided non-liquid material is not moved laterally out of said path by the aspirating or suction effect which is exerted by the fan F. The pressure within the separating chamber is at a maximum at the collecting zone.

When I refer, in a claim, to means for maintaining a greater internal pressure at the collecting zone than at the anterior outlet 7, such claim is not limited to the use of the fan F or other suction device. Even if such fan is not used, the effective closure of the outer end of the collecting zone constitutes such means.

However, the use of a fan or other suction device is highly preferred. This fan maintains the interior of the separating chamber at less than normal atmospheric pressure, so that the pressure of the gas at the collecting zone 8 may be as low as minus five millimeters of water. However, this pressure is higher than in the interior of the member 7a.

Due to the low internal pressure in member 7a, considerable air would enter the member 7a directly at the inlet of chamber 3, in the absence of diaphragm 4a. By using said diaphragm, and suitably regulating the diameter of its circular bore, the atmospheric air is aspirated towards the jet, substantially in advance of said diaphragm.

The diaphragm 4 provides additional regulation of the lateral movement of the atmospheric air. The moving jet substantially fills the openings of the diaphragms 4 and 4a.

The milk powder is not burned or injuriously affected, even though the hot air has a temperature which is above 100° C. This is due to the very rapid operation of the method, the cooling effect which is produced by the vaporization of the water and the expansion of the water vapor laterally away from the jet, and the other factors stated herein.

When I specify that I regulate the amount of aspirated gas which is moved in unison with the jet, by moving said jet through a diaphragm which has a bore which is sufficiently small to be substantially filled by said jet and by the aspirated gas and by the vapor, this includes the inlet opening in the outer wall of the separating chamber, or the diaphragm 4a which is directly located at said inlet opening of said outer wall. In the embodiments of Figs. 1 and 2, the particles of milk powder or other solid material are moved in a straight-line path towards the collecting zone. In Fig. 2 the separating chamber has a horizontal axis, but the milk powder or the like has been fully separated from the gas and vapor, anterior the point where the milk powder drops into the collecting zone, save that there is some gaseous atmosphere at the collecting zone. Therefore, whenever I specify that the milk powder or the like is moved in a straight-line path towards the collecting zone, I include both embodiments of Fig. 1 and Fig. 2.

I have illustrated preferred embodiments of my invention, but numerous changes and omissions can be made without departing from its spirit.

I claim:

1. A method of treating a liquid which has a non-liquid ingredient, in order to separate said non-liquid ingredient in finely-divided solid form from said liquid, which consists in atomizing said liquid and substantially wholly vaporizing said liquid by a jet of heated gas which has a higher temperature than said liquid, said jet having enough heat to substantially wholly vaporize the liquid, aspirating additional gas in the form of a sheath around the jet heated gas subsequent to the atomization of the liquid, the aforesaid operations being substantially completed anterior the outer wall of a separating chamber so that the non-liquid ingredient is in finely-divided solid form anterior the outer wall of said separating chamber, then leading the finely divided non-liquid ingredient in solid form and the vapor and the gas into said separating chamber through an inlet in its outer wall, the gas being of greater density than said vapor, removing the finely-divided non-liquid ingredient in solid form from said chamber through a first outlet, removing the vapor and the gas from the separating chamber through a second outlet which is located anterior the first outlet, subjecting said chamber to positive suction at said second outlet.

2. A method of treating a liquid which has a non-liquid ingredient, in order to separate said non-liquid ingredient in finely-divided solid form from said liquid, which consists in atomizing said liquid substantially wholly by a jet of heated gas which has a higher temperature than said liquid, said jet having enough heat to substantially wholly vaporize the liquid, aspirating additional gas in the form of a sheath around the jet of heated gas subsequent to the atomization of the liquid, the aforesaid operations being substantially completed anterior the outer wall of a separating chamber so that the non-liquid ingredient is in finely-divided solid form anterior the outer wall of said separating chamber, then leading the finely-divided non-liquid ingredient in solid form and the vapor and the gas into said separating chamber through an inlet in its outer wall, the gas being of greater density than said vapor, removing the finely-divided non-liquid ingredient in solid form from said chamber through a first outlet, removing the vapor and the gas from the separating chamber through a second outlet which is located anterior the first outlet, substantially deflecting the vapor from the finely-divided non-liquid material anterior the first outlet by subjecting the separating chamber to positive suction at said second outlet while moving the finely-divided non-liquid ingredient in solid form into and through the separating chamber towards said first outlet with sufficient velocity to prevent any substantial part of said finely-divided non-liquid ingredient in solid form from moving out of said separating chamber through said second outlet.

3. A method of treating a liquid which has a non-liquid ingredient, in order to separate the non-liquid ingredient in finely-divided solid form from said liquid, which consists in atomizing and vaporizing said liquid by means of a jet of heated gas which is moved through a gaseous atmosphere, aspirating gas from said atmosphere towards said jet and propelling said aspirated gas by means of said jet in the same direction as the direction of said jet, regulating the amount of aspirated gas which is moved in unison with the jet by moving the jet through a diaphragm having a bore which is sufficiently small to be substantially filled by said jet and aspirated gas and vapor.

4. Apparatus for spray-drying an aqueous liquid which has a non-liquid ingredient, comprising a separating chamber which has an inlet opening at its front end, said chamber having means at its rear end for conveying the collected non-liquid ingredient out of said chamber while substantially confining gas and vapor at said rear end, a pipe which delivers a jet of heated gas at the outlet end of said pipe, the density of said heated gas exceeding the density of water vapor at the same temperature, said jet moving along an axis which passes through said inlet opening, said chamber having an outlet which is located anterior said rear end, means adapted to supply a moving body of said liquid to said jet to be atomized by said jet, said jet having sufficient heat to vaporize the liquid, said chamber having an outlet opening anterior its rear end, and diaphragm means located anterior said chamber and having a bore through which said jet passes, the outlet end of said pipe being located to have access to atmospheric air so that atmospheric air is aspirated by said jet, said bore being sufficiently small to limit the amount of atmospheric air which is aspirated by said jet through said inlet opening.

5. A method of treating a liquid which has a non-liquid ingredient, in order to separate said non-liquid ingredient in finely-divided solid form from said liquid, with the use of a separating chamber which has an outer wall which is provided with an inlet, which consists in producing a jet of heated gas anterior said inlet, moving said jet in a straight line towards said inlet, introducing said liquid into said jet anterior said inlet through the outer lateral wall of said jet, substantially wholly vaporizing said liquid by the heat of said jet anterior said inlet, retaining said finely-divided solid ingredient in said jet and leading said jet and the vapor of said liquid and said finely-divided ingredient in solid form through said inlet into said separating chamber, and separating said solid and finely-divided non-liquid ingredient from said jet only in said separating chamber, said jet having sufficient velocity anterior said inlet to maintain its jet form and to retain said solid ingredient in said jet independently of external confining means.

6. Apparatus for spray-drying a liquid which has a non-liquid ingredient, comprising a separating chamber which has an outer wall which has an inlet opening, means located external to said outer wall and adapted to produce a jet of heated gas which moves in a straight line towards and through said inlet opening, additional means located external to said outer wall and external to the outer wall of said jet to introduce said liquid into said jet anterior said inlet opening, said jet having sufficient heat to vaporize said liquid substantially wholly anterior said inlet opening, said jet having sufficient velocity to atomize said liquid and to retain said non-liquid ingredient in finely-divided solid form, said chamber having a collecting zone for collecting said finely-divided solid ingredient, said chamber having an outlet for said gas and for the vaporized liquid.

7. Apparatus for spray-drying a liquid which has a non-liquid ingredient, comprising a separating chamber which has an outer wall which has an inlet opening, means located external to said outer wall and adapted to produce a jet of heated gas which moves in a straight line towards and through said inlet opening, additional means located external to said outer wall and external to the outer wall of said jet to introduce said liquid into said jet anterior said inlet opening, said jet having sufficient heat to vaporize said liquid substantially wholly anterior said inlet opening, said jet having sufficient velocity to atomize said liquid and to retain said non-liquid ingredient in finely-divided solid form, said chamber having a collecting zone for collecting said finely-divided solid ingredient, said chamber having an outlet for said gas and for the vaporized liquid, said collecting zone being closed and being aligned with said straight line, said outlet being located anterior said zone, so that said jet produces a pressure in said collecting zone which deflects said gas and said vaporized liquid from said zone, in a direction rearward to the movement of said jet through said inlet opening.

8. Apparatus for spray-drying a liquid which has a non-liquid ingredient, comprising a separating chamber which has an outer wall which has an inlet opening, means located external to said outer wall and adapted to produce a jet of heated gas which moves in a straight line towards and through said inlet opening, additional means located external to said outer wall and external to the outer wall of said jet to introduce said liquid into said jet anterior said inlet opening, said jet having sufficient heat to vaporize said liquid substantially wholly anterior said inlet opening, said jet having sufficient velocity to atomize said liquid and to retain said non-liquid ingredient in finely-divided solid form, said chamber having a collecting zone for collecting said finely-divided solid ingredient, said chamber having an outlet for said gas and for the vaporized liquid, said collecting zone being closed and being aligned with said straight line, said outlet being located anterior said zone, so that said jet produces a pressure in said collecting zone which deflects said gas and said vaporized liquid from said zone, in a direction rearward to the movement of said jet through said inlet opening, and an exhaust device adapted to exhaust said gas and said vapor from said chamber through said outlet.

9. A method of treating a liquid which has a non-liquid ingredient therein, in order to separate said non-liquid ingredient in finely-divided solid form from said liquid, which consists in intermixing said liquid with a forwardly moving jet of heated gas whose specific gravity exceeds the specific gravity of the vapor of said liquid, said jet being originated at a predetermined origin, said liquid being introduced into said jet at a part of said jet which succeeds said origin, said heated gas vaporizing said liquid, moving the vapor of said liquid and said finely-divided solid ingredient while intermixed with said forwardly moving jet, forwardly in a chamber towards a closed end of said chamber, said forwardly moving jet being thus moved forwardly in a zone which is spaced laterally by an intermediate zone from the part of the wall of said chamber which is located anterior said closed end, said forwardly moving jet being moved towards said closed end with sufficient momentum to deposit said finely-divided solid material in a collecting zone at said closed end, and to create and maintain a gas pressure at said closed end which exceeds the gas pressure in said chamber anterior said closed end, reversely deflecting vapor from said jet anterior said collecting zone and into said intermediate zone by said gas pressure thus created and maintained in said collecting zone, passing said vapor and said gas out of said chamber through an outlet of said chamber which communicates directly with said intermediate zone and which is located anterior said collecting zone.

MAX FRIEDRICH GRUBER.